J. H. PROCTER.
ELECTRICAL PROTECTIVE DEVICE.
APPLICATION FILED MAY 7, 1917.

1,437,074.

Patented Nov. 28, 1922.

WITNESSES:
Fred. A. Lind.
Fred H. Muller

INVENTOR
Joseph H. Procter
BY
Wesley G. Carr
ATTORNEY

Patented Nov. 28, 1922.

1,437,074

UNITED STATES PATENT OFFICE.

JOSEPH H. PROCTER, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL PROTECTIVE DEVICE.

Application filed May 7, 1917. Serial No. 167,084.

*To all whom it may concern:*

Be it known that I, JOSEPH H. PROCTER, a citizen of the United States, and a resident of Wilkinsburg, in the county of Allegheny and State of Pennsylvania, have invented a new and useful Improvement in Electrical Protective Devices, of which the following is a specification.

My invention relates to electrical protective devices and particularly to overload time-limit relays.

One object of my invention is to provide a relay of the above indicated character that shall be adapted to operate in a time that varies inversely as the current traversing the circuit to be protected up to a predetermined value of overload and that shall operate in a definite time for all other values of overload.

Another object of my invention is to provide an inverse-definite-time-limit overload relay that shall be inexpensive to construct and efficient in its operation.

In practicing my invention, I provide an overload relay having an actuating winding that is supplied with current from the circuit to be protected. An iron-wire or other suitable resistor is connected in series with the relay winding and is so proportioned that the current traversing the same increases in accordance with the voltage supplied to it up to a predetermined value of voltage, at which value it becomes sufficiently heated to cause its resistance to so change that the current traversing the same remains substantially constant irrespective of the voltage applied. This type of resistor comes into effective operation under such conditions that the relay may operate in accordance with the overload in the circuit to be protected up to a predetermined overload and have a substantially definite time of operation above that value of overload. With such a device any number of relays may be operated in series and definite selective operation may be obtained. That is, irrespective of the value of the overload, the time of operation of the relays is always a definite effective value.

Figure 1:
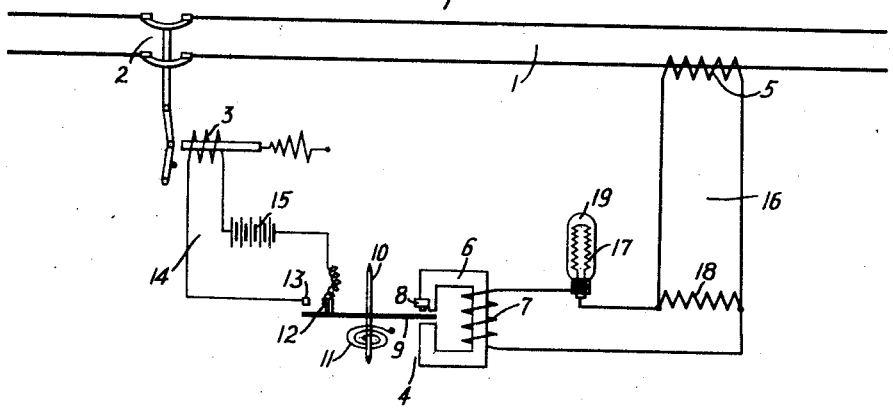
Figure 2:
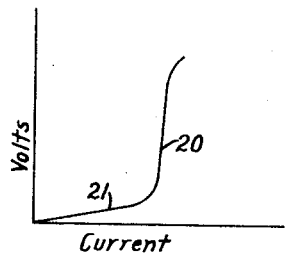
Figure 3:
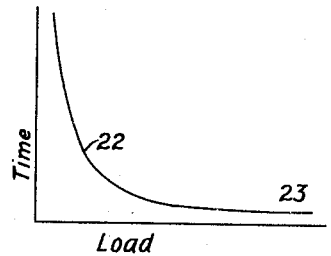

Figure 1 of the accompanying drawings is a diagrammatic view of an electrical circuit embodying my invention; Fig. 2 is a diagram illustrating the relation between the voltage applied to, and the current traversing, the controlling resistor embodying my invention, and Fig. 3 is a diagram illustrating the relation between the time of operation of the relay and the load traversing the circuit to be protected.

An electric circuit 1 is provided with a circuit interrupter 2 having a trip coil 3 that is adapted to be controlled by a relay 4 which receives current from the circuit 1 through a series transformer 5.

The relay 4 comprises a magnetizable core member 6 having a main winding 7, an auxiliary winding 8, and an armature 9 that is mounted upon a shaft 10. A spring 11 is operatively connected to the shaft 10 for the purpose of controlling the movement of the armature which is provided with a movable contact member 12 that is adapted to engage a stationary contact member 13 under predetermined conditions. The contact members 12 and 13 constitute the separable terminals of a circuit 14 comprising the winding of the trip coil 3 and a source 15 of electromotive force. The terminals of the transformer 5 are connected to a circuit 16 comprising a resistor 17, the winding 7, and a resistor 18. The resistor 18 is connected in shunt relation to the transformer 5 in order that the winding 7 may be supplied with current under normal conditions proportional to the drop in potential across the resistor 18 and, consequently, in proportion to the current traversing the circuit 1.

The resistor 17 is preferably constructed of iron as iron has been determined to have the desired characteristics; other suitable material may be used. The resistor 17 is enclosed in an evacuated receptacle 19 for the purpose of preventing oxidation of the same. The resistor 17 is so proportioned that the current traversing the same will vary in accordance with the drop in potential across the resistor 18 up to a predetermined value of current in the circuit 1. This value of current is preferably several hundred per cent overload in the circuit, however, it may be any value of current according to the desired operation of the relay 4. Above this value of overload, the resistor is adapted to become heated to a red heat by the passage of current therethrough and its resistance is adapted to so change that, irrespective of the change in potential across the resistor 18, the current traversing the same is substantially constant. Since the winding 7 is connected in series with the resistor 17, current will traverse the winding 7 in accordance with the current traversing the circuit 1 up to a predetermined value of overload and will be substantially constant at all values of overload above this predetermined value. Thus, the time required for the armature 9 to cause the contact members 12 and 13 to complete the circuit 14 and trip the interrupter 2 will vary inversely as the current traversing the circuit 1 up to a predetermined value of overload and will be substantially constant for all values of overload above this predetermined value.

The diagram shown in Fig. 2 of the drawings illustrates the characteristic curve of the current traversing an iron-wire resistor for various voltages applied thereacross, the substantially vertical portion 20 of the curve being arranged to occur at any predetermined value of current in the circuit 1. In view of the above, the resistor 17 may be so proportioned that the portion 21 of the curve will represent the current through the windings 7 and 17 up to several hundred per cent overload and the portion 20 will represent the current through the windings 7 and 17 for all values of current traversing the circuit 1 above this predetermined value of overload. Thus, the time of operation of the relay will follow a curve substantially as shown in Fig. 3 of the drawings wherein the portion 22 illustrates the inverse-time-limit characteristics of the relay and the portion 23 the definite-time-limit characteristics of the relay.

I do not limit my invention to the particular type of relay, or to the particular type of controlling resistor illustrated, as various modifications may be made without departing from the spirit and scope of the invention as set forth in the appended claims.

I claim as my invention:

1. A relay for an electric circuit comprising a movable circuit-controlling member, an actuating winding therefor operatively connected to the circuit, and an iron-wire resistor connected in series with the said winding for causing the time of operation of the circuit-controlling member to vary in accordance with the current traversing the circuit up to a predetermined value and to be substantially constant above that value.

2. In a relay for an electric circuit, the combination with a movable member and a winding therefor operatively connected to the circuit, of an iron-wire resistor connected in series with the winding for causing the movable member to develop a torque that varies as one power of the current traversing the circuit up to a predetermined value of current and a lesser power for all other values of current.

3. In a relay for an electric circuit, the combination with a movable member and a winding therefor receiving current from the circuit, of an iron-wire resistor so connected in circuit with the winding that the movable member will develop a substantially constant torque when the current traversing the circuit exceeds a predetermined value.

4. In an electric circuit, the combination with a relay winding operatively connected to the circuit, of a resistor connected in series with the winding and having such characteristics that its resistance increases directly in accordance with the drop in potential thereacross under predetermined conditions to maintain the current in the winding and the time of operation of the relay substantially constant.

5. In an electric circuit, the combination with a relay winding, of a resistor connected in series with the winding and having such characteristics that its resistance remains substantially constant under predetermined conditions and increases directly in accordance with the drop in potential thereacross under other predetermined conditions to cause the current traversing the winding and the time of operation of the relay to be variably proportionate to the current in the circuit.

6. In an electric circuit, the combination with a relay winding receiving current from the circuit, of an iron-wire resistor connected in series with the winding and so proportioned that it becomes incandescent under predetermined conditions to cause the current traversing the winding and the time of operation of the relay to be substantially constant irrespective of the current traversing the circuit.

7. In an electric circuit, the combination with a relay winding receiving current from the circuit, of means connected in circuit with the winding for so increasing the resistance of the winding circuit under predetermined conditions that the relay has a substantially constant speed, irrespective of the current traversing the circuit.

8. In an electric circuit, the combination with a relay having an actuating winding, of a resistor connected between the winding and the circuit and having such resistance characteristics that the current traversing the winding shall vary in accordance with the current traversing the circuit up to a predetermined value of current in the circuit and shall be substantially constant for all other values of current in the circuit.

9. In an overload relay for an electric circuit, the combination with a circuit-controlling member and a winding therefor operatively connected to the circuit, of an iron-wire resistor connected to the winding for so controlling the current traversing the winding that the circuit-controlling member is actuated in a time that varies inversely as the current in the circuit under predetermined overload conditions and in a substantially definite time for all other values of overload in the circuit.

10. In an electric circuit, the combination with a circuit interrupter and an overload relay operatively connected to the circuit for controlling the interrupter, of a resistor connected in series with the winding of the relay and having such resistance characteristics that under predetermined conditions its resistance increases rapidly to such value as to limit the time of operation of the relay to a substantially definite value irrespective of the current traversing the circuit.

11. An overload relay for an electric circuit comprising a winding receiving current from the circuit, and a resistor connected in series with the winding having such resistance characteristics that it presents a substantially constant resistance to the flow of current in the winding under predetermined overload conditions and such resistance to the flow of current under other overload conditions that a substantially constant current traverses the winding irrespective of the current traversing the circuit.

12. In an electric circuit, the combination with a relay having an actuating winding operatively connected to the circuit, of an iron-wire resistor connected in circuit with the winding for so increasing the resistance of the winding circuit, under predetermined conditions, that the relay has a substantially constant speed irrespective of the current traversing the circuit.

13. In an electric circuit, the combination with a relay having an actuating winding operatively connected to the circuit, of an iron-wire resistor connected in series with the winding for so increasing the resistance of the winding circuit, when the current traversing the circuit increases, that the relay has a substantially constant speed.

14. The combination with an electrical conductor, of a current transformer therefor, means connected in circuit therewith across which a drop in voltage occurs, a winding to be energized therefrom for controlling the circuit of the electrical conductor and saturable means associated with the voltage-drop means for controlling the degree to which the circuit-controlling winding may be energized by causing such available drop in voltage to vary directly with the current traversing the voltage-drop means up to a predetermined amount and then maintaining such drop in voltage substantially constant.

15. The combination with a current transformer, means in the circuit thereof across which a drop in voltage occurs, which drop increases with the current in said circuit up to a predetermined amount and then remains substantially constant, an electro-responsive device operative by currents above a predetermined amount connected in circuit with the transformer and the voltage-drop means, and a normally open-circuit containing a trip coil closable by the electro-responsive device.

16. The combination with an electrical conductor, a transformer responsive to current in said conductor, electro-responsive means operative upon currents above a predetermined amount, a current-limiting means in said transformer circuit having a voltage drop which increases with the current up to a predetermined amount and then remains substantially constant, and a normally open circuit closable by the operation of said electro-responsive means.

17. In an electric circuit, the combination with a conductor and a current transformer therefor, of an element in circuit therewith across which a drop in potential occurs by reason of current caused to traverse the same from the transformer, a winding to be energized by and in accordance with the drop in potential across said element, saturable means associated with said element to control the amount of the potential drop that shall be operative to energize the winding and means for electrically connecting the winding to said element.

18. In an electric circuit, the combination with a conductor and a current transformer therefor, of an element in circuit therewith across which a drop in potential occurs by reason of current caused to traverse the same from the transformer, a winding operative to control the circuit of the conductor, means for electrically connecting the winding across the terminals of the drop-producing element to cause the winding to be energized therefrom, and saturable means associated with the drop-producing element for controlling the degree to which the winding may be energized by controlling the potential drop effective to energize the winding to cause such drop in potential to vary directly with the amount of current traversing the drop-producing element up to a predetermined value and to remain substantially constant for currents exceeding such value.

In testimony whereof, I have hereunto subscribed my name this 27th day of April, 1917.

JOSEPH H. PROCTER.